(12) United States Patent
Shah et al.

(10) Patent No.: US 6,636,931 B2
(45) Date of Patent: *Oct. 21, 2003

(54) SYSTEM AND METHOD FOR SWITCHING SIGNALS OVER TWISTED-PAIR WIRES

(75) Inventors: Prasanna M. Shah, Sunnyvale, CA (US); Robert L. Taber, Santa Clara, CA (US); Herbert J. Kniess, San Jose, CA (US)

(73) Assignee: Pragmatic Communications Systems, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/226,869

(22) Filed: Jan. 6, 1999

(65) Prior Publication Data

US 2002/0026552 A1 Feb. 28, 2002

Related U.S. Application Data

(60) Provisional application No. 60/072,106, filed on Jan. 6, 1998.

(51) Int. Cl.[7] .............................................. G06F 13/00
(52) U.S. Cl. ..................................................... 710/317
(58) Field of Search ................................. 710/132, 316, 710/317; 340/825.79, FOR 279; 370/351, 386; 385/17; 348/462, 14.12; 709/217, 218; 333/101

(56) References Cited

U.S. PATENT DOCUMENTS

| | | | | |
|---|---|---|---|---|
| 4,417,245 A | * | 11/1983 | Melas et al. ................ 340/827 |
| 4,807,183 A | * | 2/1989 | Kung et al. | |
| 4,833,670 A | * | 5/1989 | Lebizay et al. ............. 370/383 |
| 5,068,880 A | * | 11/1991 | Kline et al. | |
| 5,130,793 A | * | 7/1992 | Bordry et al. ............... 375/232 |
| 5,144,548 A | * | 9/1992 | Salandro ..................... 364/138 |
| 5,172,413 A | * | 12/1992 | Bradley et al. ............ 340/5.74 |
| 5,283,637 A | * | 2/1994 | Goolcharan ............. 348/14.12 |
| 5,283,780 A | * | 2/1994 | Schuchman et al. | |
| 5,289,272 A | * | 2/1994 | Rabowsky et al. ......... 348/462 |
| 5,367,273 A | * | 11/1994 | Georger et al. ................. 333/1 |
| 5,430,442 A | * | 7/1995 | Kaiser et al. .......... 340/825.79 |
| 5,440,554 A | * | 8/1995 | Stannard et al. ............ 370/352 |
| 5,444,676 A | * | 8/1995 | Balsamo et al. ............... 369/4 |
| 5,450,549 A | * | 9/1995 | Casparian ................... 345/509 |
| 5,481,125 A | * | 1/1996 | Harris | |
| 5,519,526 A | * | 5/1996 | Chua et al. ................. 359/152 |
| 5,530,813 A | * | 6/1996 | Paulsen et al. ............. 710/132 |
| 5,530,814 A | * | 6/1996 | Wong et al. | |
| 5,634,004 A | * | 5/1997 | Gopinath et al. ........... 710/132 |
| 5,719,971 A | * | 2/1998 | Smith .......................... 385/17 |
| 5,856,980 A | * | 1/1999 | Doyle | |
| 5,929,895 A | * | 7/1999 | Berry et al. .................... 348/8 |
| 5,933,449 A | * | 8/1999 | Meyer | |
| 5,937,176 A | * | 8/1999 | Beasley et al. | |
| 5,990,945 A | * | 11/1999 | Sinha et al. ............. 348/219.1 |
| 6,044,397 A | * | 3/2000 | Eleftheriadis et al. ...... 709/217 |
| 6,058,469 A | * | 5/2000 | Baxter | |
| 6,147,963 A | * | 11/2000 | Walker et al. | |

* cited by examiner

Primary Examiner—Paul R. Myers
(74) Attorney, Agent, or Firm—Donald E. Schreiber (57) ABSTRACT

A method and system for switching signals over conductors is disclosed. The method and system comprises a plurality of encoders for receiving signals from a plurality of sources. The system further comprises a crosspoint switching matrix means for receiving encoded signals from the plurality of encoders and for providing encoded signals to a plurality of receivers. The crosspoint switching matrix means in a preferred embodiment includes a control system which is controlled by multiple remote receivers.

11 Claims, 7 Drawing Sheets

Crosspoint Matrix Switching System

Fig. 1
Crosspoint Matrix Switching System

Block Diagram of Receiver (27)

Fig. 3
Control System

Fig. 4
Control System with IR Emitter

Fig. 5

Example of switching configuration

Fig. 6

Example of switching configuration

SYSTEM AND METHOD FOR SWITCHING SIGNALS OVER TWISTED-PAIR WIRES

This application claims the benefit of Provisional Application No. 60/072,106, filed Jan. 6, 1998.

FIELD OF THE INVENTION

The present invention relates generally to the switching of signals and more particularly to switching a plurality of audio, video and data signals which are carried over twisted-pair wires.

BACKGROUND OF THE INVENTION

Modem home entertainment systems have available a plethora of electronic systems for reception or playback of audio and video programs. Examples include compact disc players, video cassette recorders, video laser disc players, digital satellite receivers and similar systems. In a typical installation these audio/video sources are located together along with the television set and stereo system, and the audio/video sources are directly connected to the television and stereo system.

There are four problems that typically occur. The first problem is that most television sets have a limited number of auxiliary audio/video inputs available. If the entertainment system is comprised of more audio/video sources than the television can accept, then some sort of external switching equipment must be provided to gain access to the additional sources. Although there are many different types of external switching equipment commercially available, they do not provide any method to alleviate the signal degradation problems discussed next. In addition, these types of external switching equipment can allow noise to be added to the signals because they are directly switching the baseband signals.

The second problem occurs when a television set is located in a different room than the main home entertainment system. Some signals, such as a radio-frequency cable television signal, are easily routed or extended from one room to another be means of a coaxial cable. Other signals, such as the high quality audio and video outputs of a digital satellite receiver system are not easily routed or extended from one room to another because the signals degrade after a short distance. All presently employed methods, such as baseband signals over coaxial cables or channel modulators which send radio-frequency signals over coaxial cables, suffer from signal degradation and loss of audio and video quality.

A third problem also occurs when a television set is located in a different room than the main home entertainment system, and that is allowing for all the different audio and video sources to be fully accessible in the remote location. For example, a common situation is that the remote television set will only have access to the cable television signals, and will not have access to the digital satellite receiver, video laser disc player, or any other equipment located with the main home entertainment system.

One possible solution to this problem would be to install individual cables for each piece of equipment and to extend each one of the signals to the remote room. This solution is usually impractical to consider due to the following problems: It is usually impractical or undesirable to install such a large number of cables within the wall. Many signals cannot be extended in such a manner due to the signal degradation problems discussed above. The remote television set would need an external switching system to select among the large number of audio/video sources. And also, it is difficult to add equipment to such a system due to the difficulty of running additional cabling through the walls to accommodate the additional signals.

The fourth problem occurs when the user is in a listening or viewing area which is located remotely from the source equipment. Because most audio/video source equipment in use is controlled by infrared remotes, and infrared signals do not penetrate walls, this poses a problem when a user is in another room or some other location beyond the range of an infrared remote, since the user would not be able to control the source equipment from the remote location. Some commercially available equipment, commonly known as "IR Extenders," use radio-frequency signals to send the IR commands from one room to another. These units have several drawbacks including difficulty in operating with a multiplicity of transmitters and receivers. Other types of systems send commands over cables to control the source equipment, but these control systems are not part of a switching system for switching audio/video signals.

Figure 1:
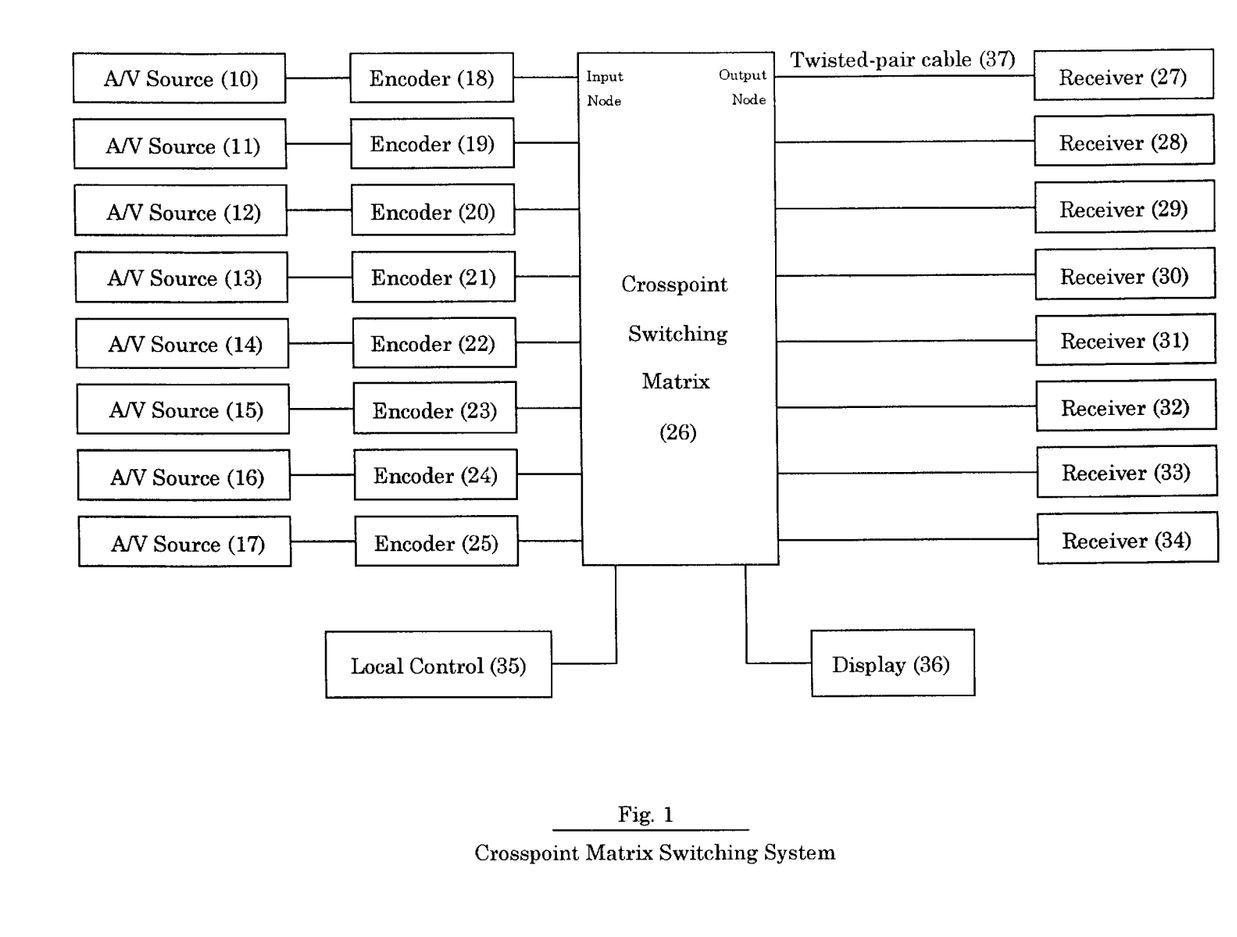
FIG. 1 shows a block diagram of the crosspoint matrix switching system.
Figure 1A:
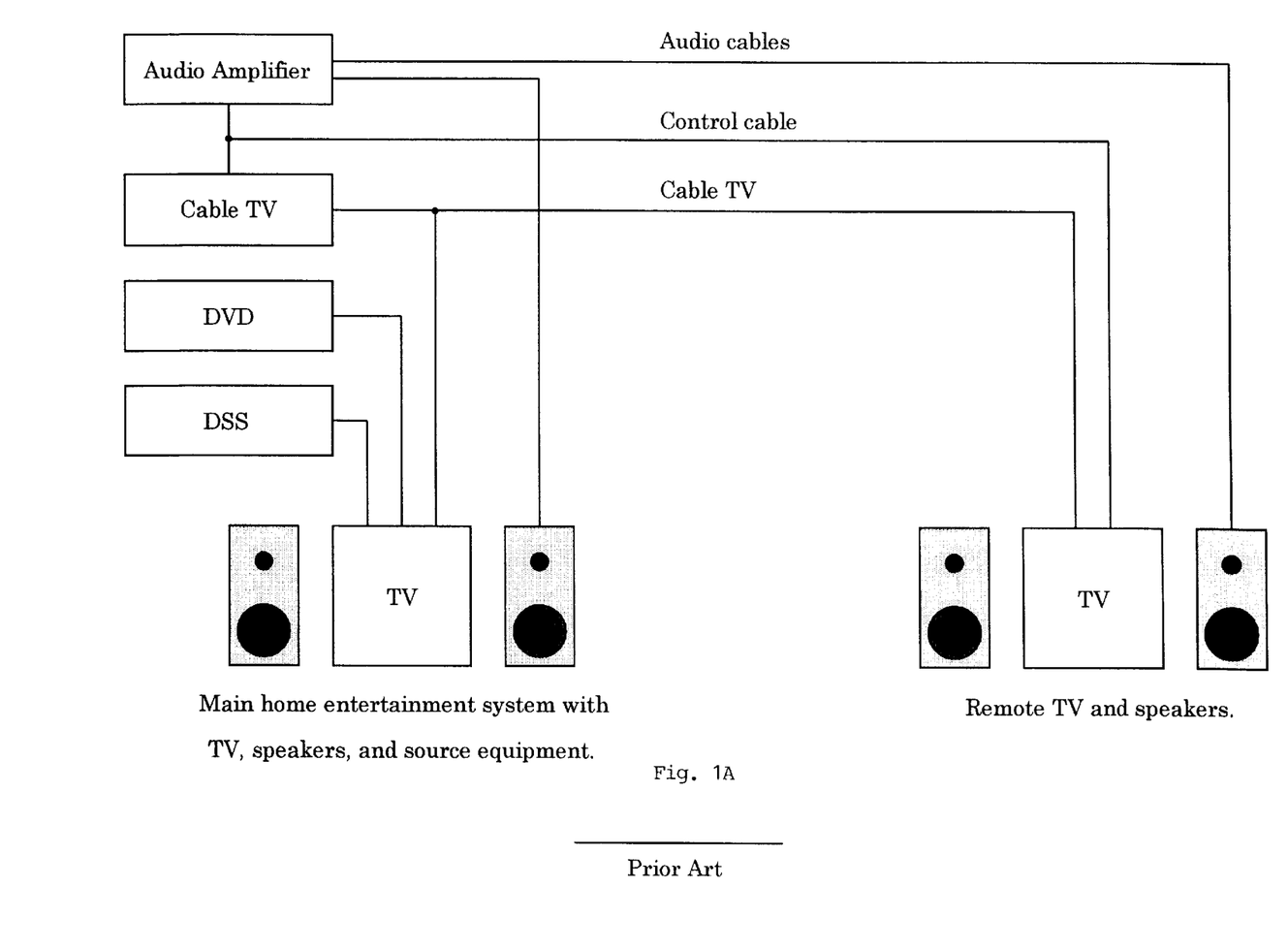
FIG. 1A shows a prior-art related method for audio/video signal distribution.

FIG. 1A illustrates a typical installation using prior art methods, with a main home entertainment system in one room and a second television and/or stereo system in another room. There are multiple sets of cables needed to distribute the various audio, video and control signals. The remote television set will only have access to lower quality audio and video signals rather than the higher quality audio and video signals available to the main home entertainment system. The object of this invention is to avoid these problems encountered with prior-art methods, and provide an apparatus to switch and distribute high-quality audio/video signals over an inexpensive twisted-pair cable.

In summary, known prior efforts for providing a plurality of audio and video signals has not provided for a mechanism such that the audio and video signals may be sent over a significant distance using a low-cost medium such as twisted-pair wires, and sent without any appreciable degradation in the signal quality.

Furthermore, known prior efforts to provide audio and video signals to be routed from audio and video sources has not provided remote control signals so that the sources can be easily controlled from a remote location. The present invention addresses such a need.

OBJECTS OF THE INVENTION

It is one object to provide and electronic switching system with a plurality of inputs and a plurality of outputs, whereby the plurality of inputs allows for a plurality of audio/video sources to be connected to the electronic switching system, and the plurality of outputs allows for a plurality of receiving devices, such as television sets and/or stereo systems, to be connected to the electronic switching system.

It is another object to provide an electronic switching system comprised of a crosspoint matrix switching system which allows for each of a plurality of outputs to be independently connected to any of a plurality of inputs.

It is another object to provide an electronic switching system comprised of a crosspoint matrix switching system which allows for any of a plurality of input sources to be connected to multiple outputs simultaneously.

It is another object to provide an electronic switching system which allows an external device, such as a television set of stereo system, access to a large number of auxiliary audio/video sources, and provide an easy to use mechanism to select one of these sources.

It is another object to provide an electronic switching system which allows for a plurality of external devices, such as television sets and/or stereo systems, to be located remotely from the audio/video sources, and have access to a large number of auxiliary audio/video sources, and provide an easy to use mechanism to select one of these sources so that each remote television set or stereo system has full access to the same audio/video sources as the local television set and stereo system.

It is another object to provide an electronic switching system with a plurality of outputs, which allows for a plurality of external devices, such as television sets and/or stereo systems, to share one electronic switching system rather than each external device needing its own switching system to gain access to the plurality of audio/video sources.

It is another object to provide a means whereby the audio/video signals are carried over an inexpensive medium, such as twisted-pair wires, which has the advantage of being easier to install than a large bundle of coaxial cables.

It is another object to provide an electronic switching system comprised of a crosspoint matrix switching system and a suitable control system which allows for both local control and remote control of the switching matrix.

It is another object to provide an electronic switching system comprised of a crosspoint matrix switching system and a suitable control system which allows for a plurality of remote control inputs.

It is another object to provide an electronic switching system comprised of a crosspoint matrix switching system and a suitable data communications system which allows for control signals for the control system of the crosspoint matrix switching system to be sent via the twisted-pair cables from any of the remote locations.

It is another object to provide an electronic switching system comprised of a crosspoint matrix switching system where the remote control inputs may be comprised of a computer interface, wired remote control, wireless infrared remote control, wireless radio frequency remote control, or additional suitable remote control inputs, either separately or in combination.

It is another object to provide an electronic switching system comprised of a crosspoint matrix switching system and a suitable control system which includes a plurality of infrared emitters to enable the system to regenerate commands from infrared remote control units, and thereby provide control signals for the audio/video sources connected to the crosspoint matrix switching system.

It is another object to provide an electronic switching system comprised of a crosspoint matrix switching system and a suitable control system which includes a method to route, either via a routing algorithm or a suitable routing apparatus, the control signals emanating from a particular remote control input to a selected audio/video source, said control signals being routed in a reverse direction that the audio/video signals are.

It is another object to provide an electronic switching system comprised of a crosspoint matrix switching system which allows for a display to show which input a given output is connected to.

It is another object to provide an electronic switching system comprised of a crosspoint matrix switching system wherein the signals being switched may be comprised of audio signals, video signals, data signals, modulated carrier signals, or any combination thereof.

It is another object to provide an electronic switching system comprised of a crosspoint matrix switching system wherein the audio, video, and data signals have been encoded and combined into a single signal prior to the switching matrix, which has the advantage that any noise added by the switching matrix is prevented from degrading any of the audio, video, or data signals by the encoding and decoding mechanism.

It is another object to provide an encoding and decoding mechanism which allows for the audio/video signals to be transmitted over a substantial distance without any appreciable degradation in the signal quality, so as to allow each of a plurality of receiver units to be located remotely from the electronic switching system.

It is another object to provide an electronic switching system wherein any or all of the audio/video sources may be located remotely from the electronic switching system, as opposed to conventional switching systems which require that the audio/video sources be located in very close proximity to the switching system.

Further objects and advantages will become apparent from a consideration of the ensuing description and drawings.

SUMMARY OF THE INVENTION

A method and system for switching signals over conductors is disclosed. The method and system comprises a plurality of encoders for receiving signals from a plurality of sources. The system further comprises a crosspoint switching matrix means for receiving encoded signals from the plurality of encoders and for providing decoded signals to a plurality of receivers. The crosspoint switching matrix means in a preferred embodiment includes a control system for controlling multiple remote receivers.

DESCRIPTION OF THE INVENTION

The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments.

FIG. 1 shows a block diagram of the crosspoint matrix switching system 9 in accordance with the present invention.

The concept of a crosspoint switching matrix is well known having been used for many years in many different applications. For example, U.S. Pat. No. 5,481,125 in the name of Harris, 1996, describes a particular type of crosspoint switching matrix implemented by a CMOS integrated circuit. Although a crosspoint switching matrix is an essential element of the invention described herein, a crosspoint switching matrix by itself will not solve the aforementioned problems, nor will it provide for all of the advantages listed in the forthcoming description.

U.S. Pat. No. 5,144,548 in the name of Salandro, 1992, describes a computer routing switcher for video signals wherein the actions of the switcher are controlled by icons on a display screen. This apparatus switches baseband audio and video signals, and therefore suffers from all of the problems described above. This system does not address the issue of audio/video signal transmission over twisted-pair wires, nor does it allow the switcher to be controlled remotely via infra-red remote control units.

U.S. Pat. No. 5,430,442 in the name of Kaiser, et al., 1995, describes a crosspoint switch with a distributed control mechanism. This crosspoint switch is designed for use within a computer data communications network, and as such, it lacks the ability to handle audio or video signals. The control circuitry, being contained within each of several ports, lacks the ability to be controlled both by local means and remote means.

In summary, known prior efforts to provide a crosspoint matrix system for audio and video signals has not provided for an encoding and decoding mechanism such that the audio and video signals may be sent over a significant distance using a low-cost medium such as twisted-pair wires, and sent without any appreciable degradation in the signal quality.

Furthermore, known prior efforts to provide a switching system for audio and video signals to be routed from audio and video sources has not provided remote control signals so that the sources can be easily controlled from a remote location.

A plurality of audio/video sources 10–17 are individually connected to a plurality of encoders 18–25. Each encoder 18 is connected to an input node of a crosspoint switching matrix 26. The crosspoint switching matrix 26 is comprised of a plurality of input nodes, a plurality of output nodes, and an electronic switching system which allows for each one of the input nodes to be independently connected to any or all of the output nodes. Each output node of crosspoint switching matrix 26 is connected to a receiver 27–34. Receiver 27 may be located at a remote distance from crosspoint switching matrix 26. In a preferred embodiment of this invention, receiver 27 may be connected to crosspoint switching matrix 26 by a twisted-pair cable 37 or the equivalent thereof. In other embodiments of this invention, receiver 27 may be connected to crosspoint switching matrix 26 by a coaxial cable, or other types of cables which are suitable for the types of signals being propagated from crosspoint switching matrix 26 to receiver 27.

The crosspoint matrix switching system 9 may also include a means for local control 35, which may be comprised of a set of front panel switches or equivalent means. The crosspoint matrix switching system 9 may also include a means for display 36, such as a liquid crystal display or equivalent display means, to allow for the display of the crosspoint switching matrix 26 settings.

Figure 2:
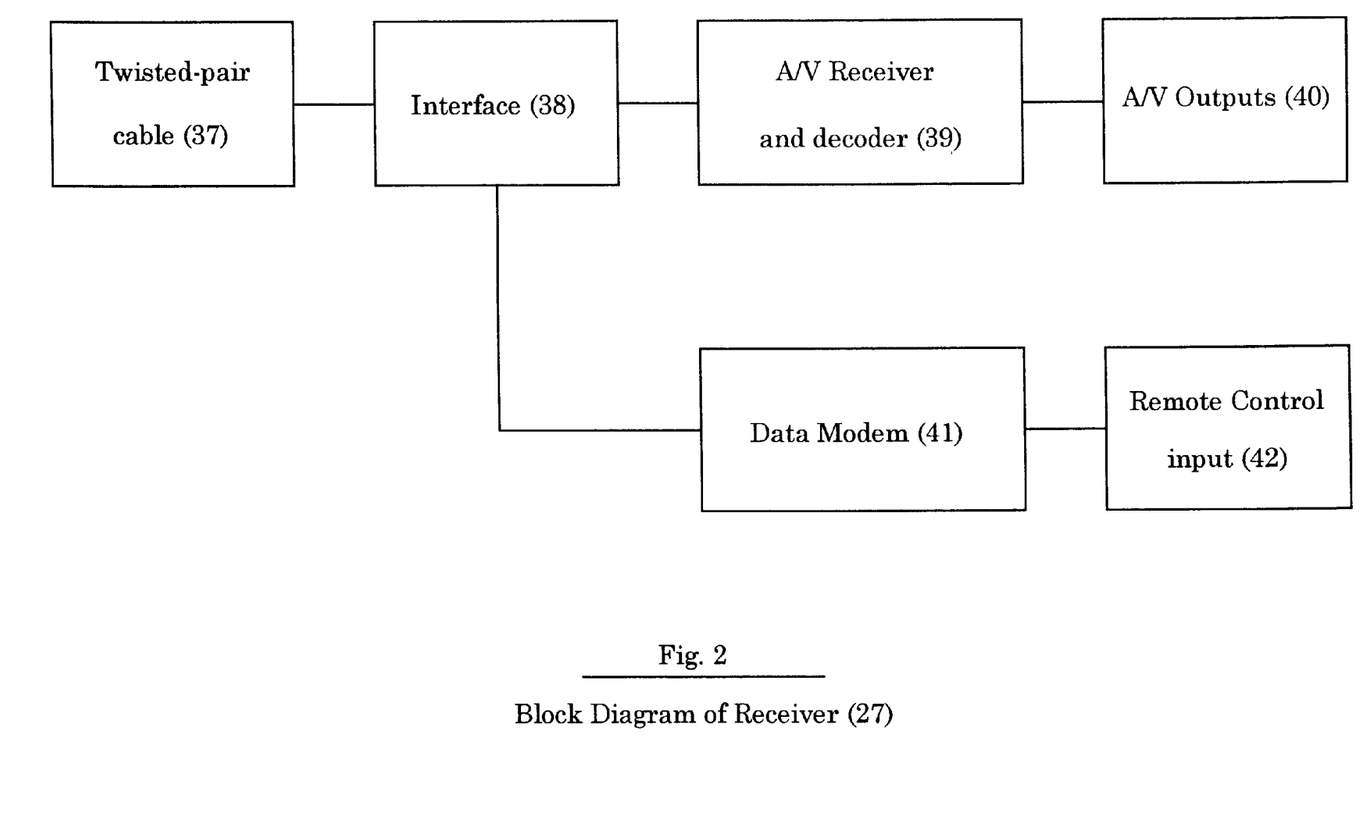
FIG. 2 shows a more detailed block diagram of the receiver portion of the crosspoint matrix switching system.

FIG. 2 shows a more detailed block diagram of the receiver 27 of the crosspoint matrix switching system. A set of input and output signals are propagated over a twisted-pair cable 37 to an interface circuit 38. Interface circuit 38 provides an output signal which is connected to an audio/video receiver and decoder 39. Interface circuit 38 further accepts an input signal from a data modem 41. Audio/video receiver and decoder 39 provides a set of audio/video outputs 40 for the user. Data modem 41 accepts an input signal from a remote control input 42, and sends its output to interface circuit 38.

Figure 3:
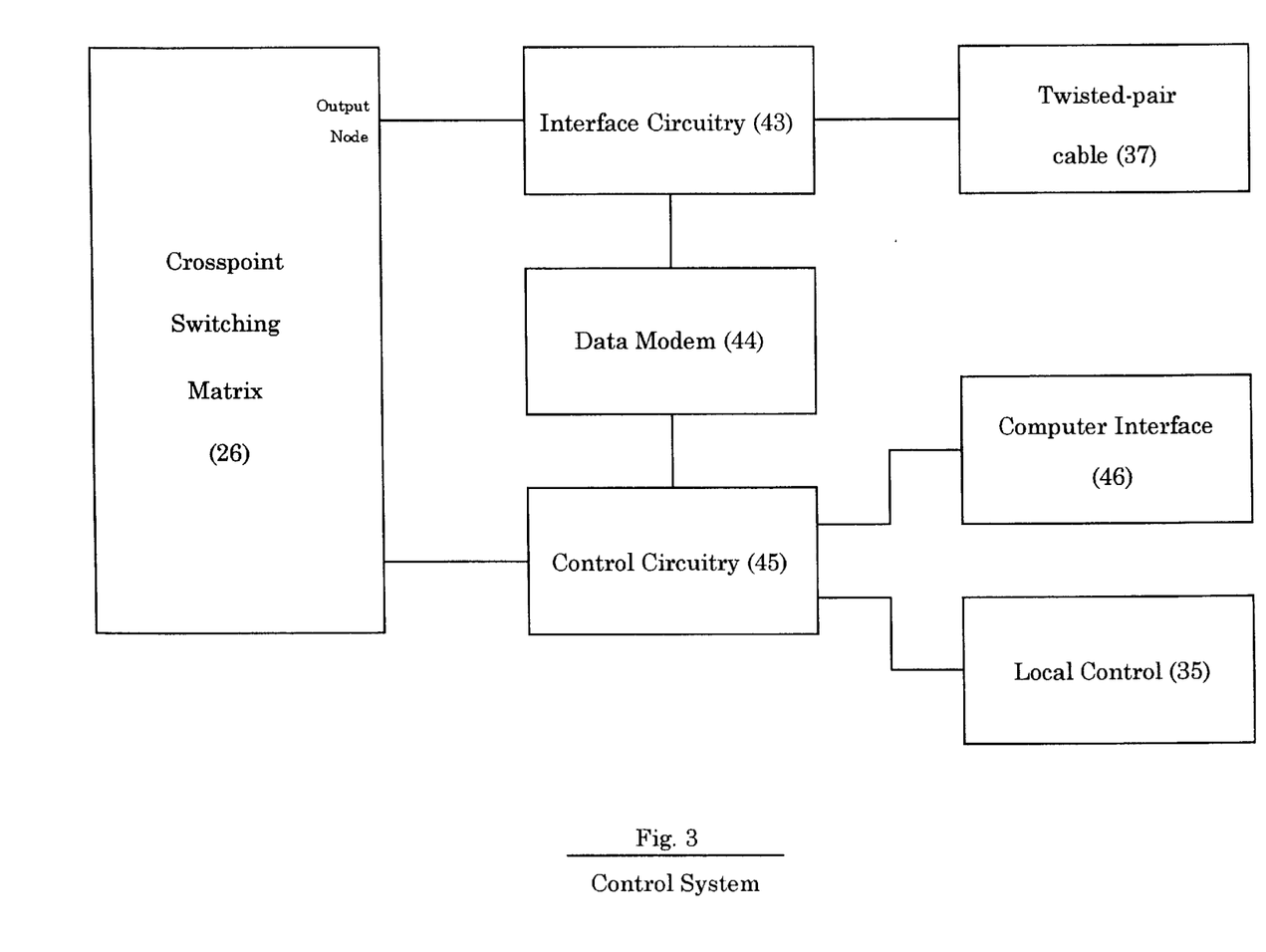
FIG. 3 shows a block diagram of the control system for the crosspoint matrix switching system.

FIG. 3 shows a block diagram of the control system for the crosspoint matrix switching system 9. A set of input and output signals are propagated over a twisted-pair cable 37 to an interface circuit 43. Interface circuit 43 accepts an input signal from crosspoint switching matrix 26 for propagation over twisted-pair cable 37. Interface circuit 43 further provides an output signal which is connected to a data modem 44. Data modem 44 provides an output signal which is connected to control circuitry 45. Control circuitry 45 provides a set of control signals which are connected to crosspoint switching matrix 26.

Figure 4:
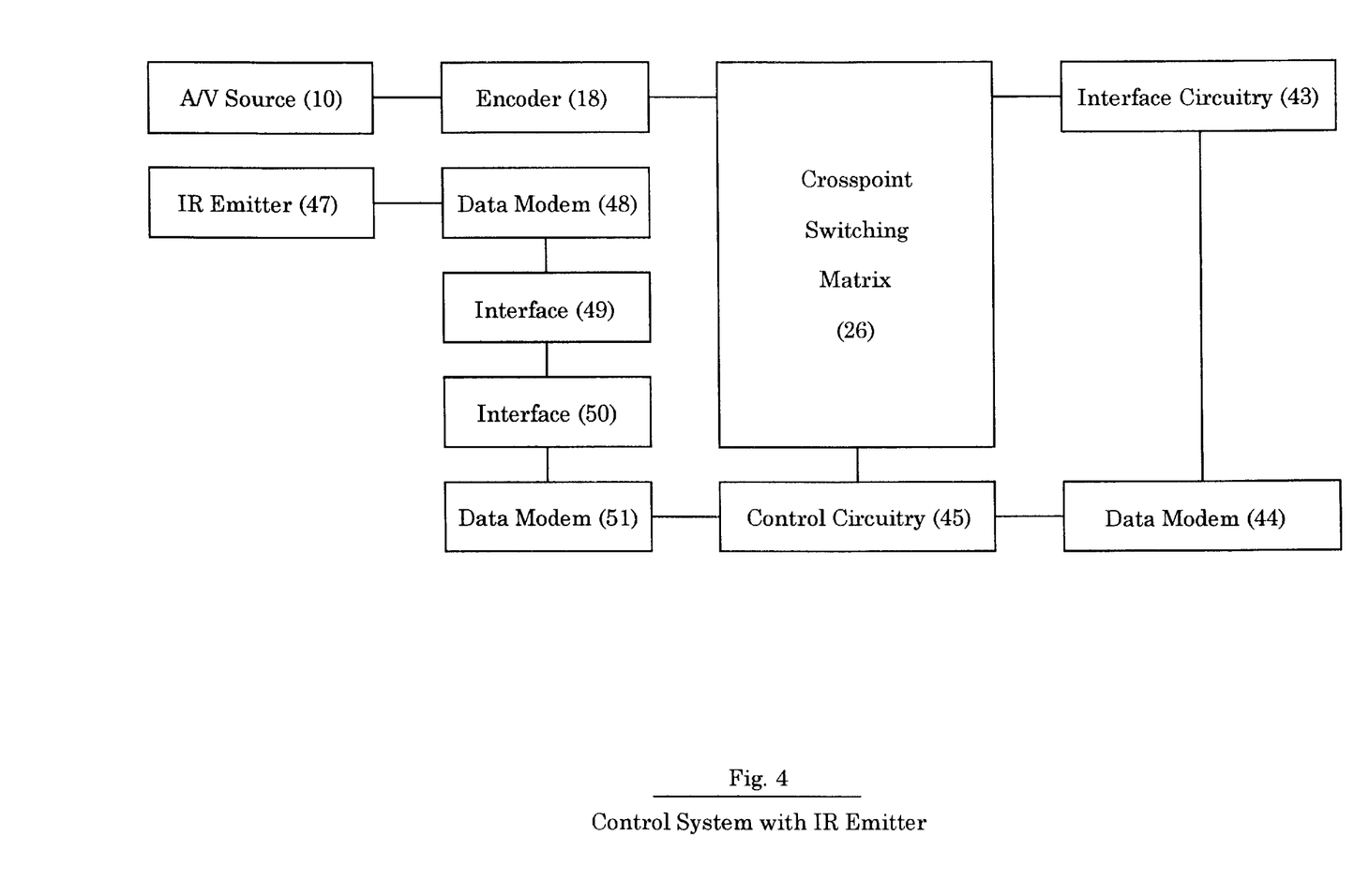
FIG. 4 shows a block diagram of the control system including IR emitters for the crosspoint matrix switching system.

FIG. 4 shows the control system for the crosspoint matrix switching system, including an IR emitter 47 for the conveyance of control signals to audio/video source 10. The control signals are generated by control circuitry 45, and are connected to data modem 51. Data modem 51 applies a suitable modulation or amplification to the control signals. The output of data modem 51 goes to an interface circuit 50, which is connected to an interface circuit 49. The output of interface circuit 49 goes to data modem 48. Data modem 48 supplies the control signals to the IR emitter 47.

Operation: FIGS. 1 to 6

FIG. 1 shows an overall block diagram of the crosspoint matrix switching system. Audio/video source 10 may be comprised of a video cassette recorder, cable tuner, AM/FM tuner, compact disk player, video laser disk player, digital video disk player, digital satellite receiver, camcorder, security camera, or any other source of audio and/or video signals. These audio/video signals are provided to an encoder 18. Additional audio/video sources may be provided, as shown by blocks 11 to 17. The types of these audio/video sources may be the same as, or different from the type of source provided by the first audio/video source in block 10. For example, the first audio/video source 10 may be a video cassette recorder, the second audio/video source 11 may be a digital satellite receiver, and the third audio/video source 12 may be a digital video disk player. It does not matter what type each individual audio/video source may be.

Encoder 18 accepts a set of audio and/or video signals from audio/video source 10. At this point, these audio/video signals accepted by encoder 18 are in a baseband state. For example, the audio portion will typically be from a "line-level" output of audio/video source 10, which is the same as baseband audio. Likewise, the video portion will typically be from a "video output" of audio/video source 10, which is the same as baseband video. Encoder 18 applies an encoding mechanism to the audio and video signals. Many encoding mechanisms are possible. The precise details of the encoding mechanism that may be chosen are not within the scope of this invention. In a preferred embodiment of this invention, the encoding mechanism may include the modulation of a carrier signal. In other embodiments of this invention, other methods of encoding the audio and video signals may be chosen, so long as the chosen method of encoding is compatible with crosspoint switching matrix 26, is compatible with the method of signal transmission over twisted-pair wires or other chosen transmission methods, and is able to meet the objective of transmission and recovery of the audio/video signals without appreciable signal degradation.

Since each encoder 18 is able to accept one video signal, and two audio signals, for the conveyance of stereo audio in conjunction with the video signal, each input signal needs to have its own individual encoding mechanism applied to it. After each input signal has been separately and individually encoded, it is advantageous for encoder 18 to include suitable circuitry to combine these encoded signals in such a manner as to allow them to be propagated over a pair of twisted-pair wires, or the equivalent thereof. Although the primary purpose of combining these encoded signals together is to facilitate the propagation over a single pair of twisted-pair wires, it has the additional advantage that it simplifies the construction of crosspoint switching matrix 26, since it is easier to switch a single encoded signal than multiple unencoded baseband signals.

Although the primary purpose of encoder 18 is to meet the objective of transmission and recovery of the audio/video signals over a significant distance and without any appreciable signal degradation, an additional benefit is that it allows for any or all of encoders 18 to 25 to be located a significant distance away from crosspoint switching matrix 26. This means that each of the audio/video sources 10 to 17 are not required to be located in close proximity to each other.

Crosspoint switching matrix 26 is comprised of a plurality of input nodes, a plurality of output nodes, and an electronic switching system which allows for each one of the input nodes to be independently connected to any or all of the output nodes. Each input node is configured to accept an encoded electronic signal from an encoder circuit 18 to 25.

Crosspoint switching matrix 26 is comprised of a matrix of electronically controlled switches of conventional design, where there is one individual switch for each combination of input node and output node. For example, if the crosspoint switching system is comprised of eight input nodes and eight output nodes, then the switching matrix would be comprised of sixty four individual switches. It is this matrix of switches which allows for each one of the input nodes to be independently connected to any or all of the output nodes.

Figure 5:
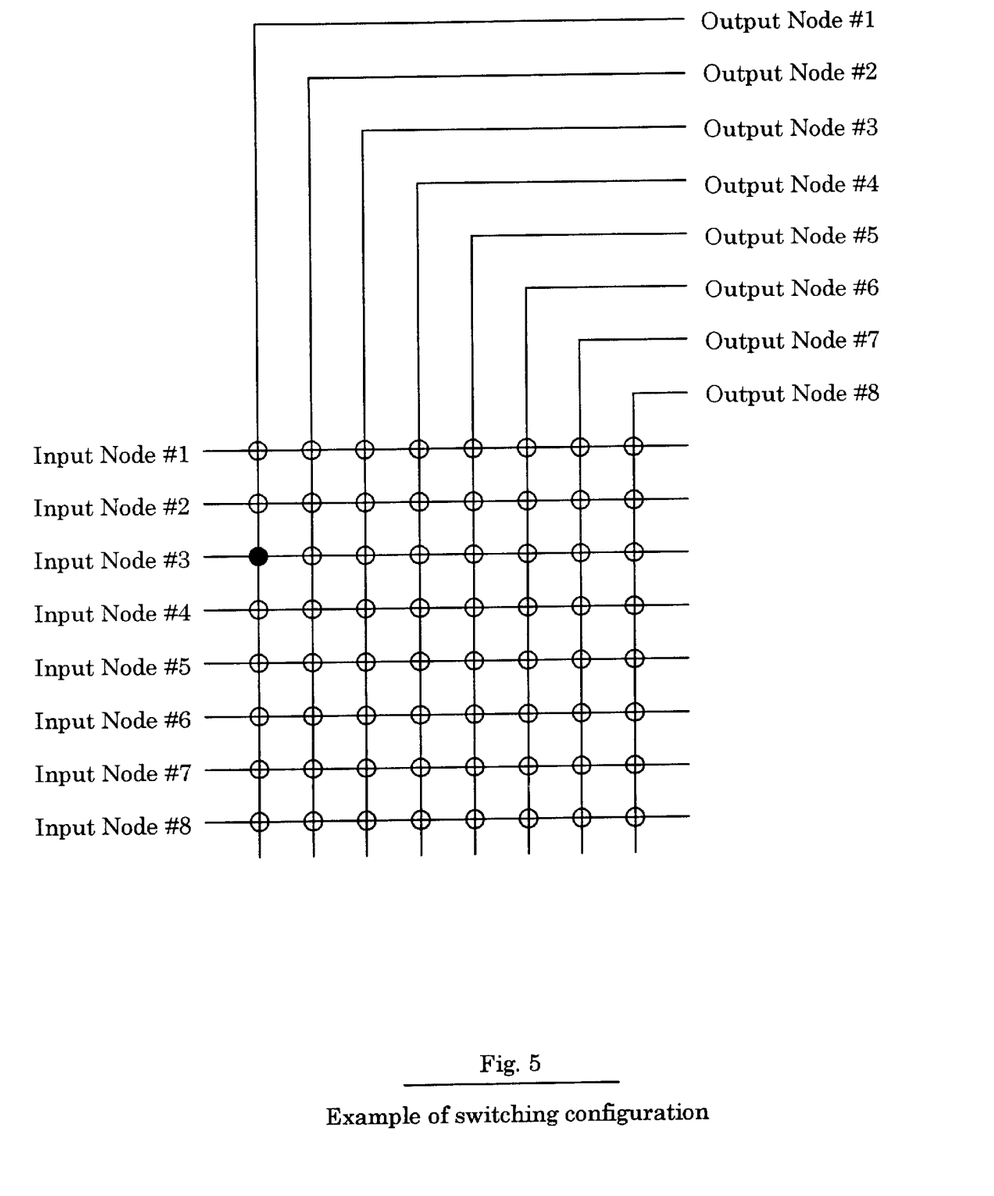
FIG. 5 shows an example switch configuration.

For example, as shown in FIG. 5, if it is desired to connect, or route, the signal present on input node #3 to output node #1, then the individual switch of the matrix at the intersection of input node #3 and output node #1 is commanded to be closed, and all other switches for output node #1 would be commanded to be open, since each output node can only be connected to one input node at a time to avoid a conflict between the signals.

Figure 6:
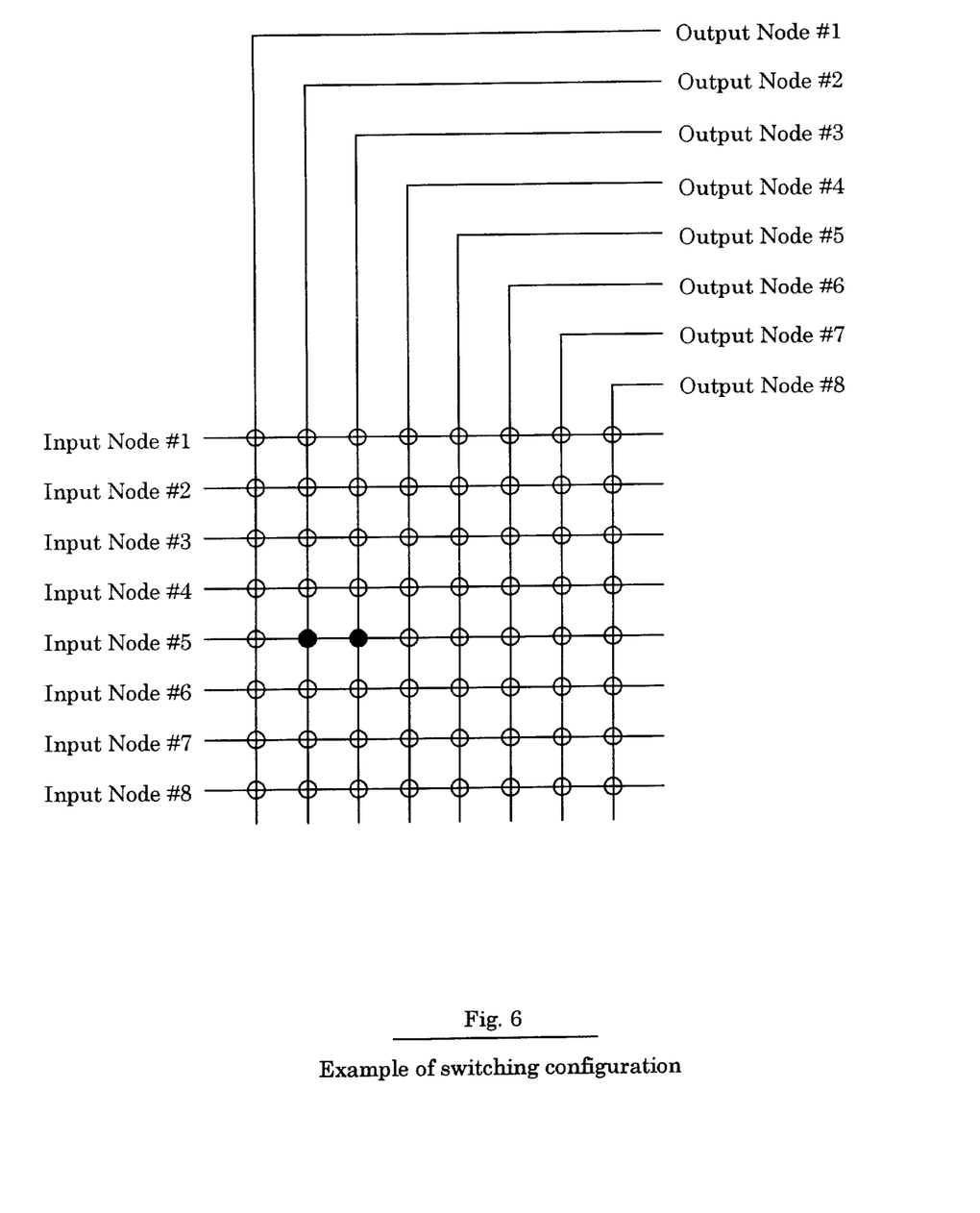
FIG. 6 shows an example switch configuration.

In further example, as shown in FIG. 6, suppose that it is desired to connect the signal present on input node #5 to both output node #2 and output node #3 simultaneously. To accomplish this, two of the switches of the switching matrix would be commanded to be closed, the first being the switch at the intersection of input node #5 and output node #2, and the second being the switch at the intersection of input node #5 and output node #3. Thus, one input node is allowed to connect to multiple output nodes simultaneously.

Because each output node may be connected to any one of the input nodes independently of how any of the other output nodes may be connected, this allows for each output node to select any one of the input sources at any time.

Again referring to FIG. 1, each output node of crosspoint switching matrix 26 is connected to a receiver 27 to 34 through an interconnect cable 37. The function of each receiver 27 to 34 is to accept an encoded signal from crosspoint switching matrix 26, decode said signal back into baseband format, and provide a set of audio/video outputs corresponding to the decoded signals. For example, suppose that audio/video source 16 is comprised of a digital video disk player, and that encoder 24 accepts the audio/video signals from audio/video source 16, encodes them in a suitable format, provides the encoded signals to an input node of crosspoint switching matrix 26, and crosspoint switching matrix 26 has been commanded to connect said input node to the output node corresponding to receiver 28, and receiver 28 accepts the encoded signals, and provides a set of audio/video outputs for the decoded, or baseband signals. The result of this operation is that receiver 28 provides a set of audio/video outputs which are the same as the audio/video signals of the digital video disk player of audio/video source 16. Therefore, each of the receivers 27 to 34 has access to any of audio/video sources 10 to 17, as selected and routed through crosspoint switching matrix 26.

The crosspoint matrix switching system 9 may also include a means for local control 35, which may be comprised of a set of front panel switches or equivalent means. Local control means 35 allows for selections to be made as to which input node is to be connected to which output node within crosspoint switching matrix 26.

The crosspoint matrix switching system may also include a means for display 36, such as a liquid-crystal display or equivalent display means, to allow for the display of the crosspoint switching matrix settings.

FIG. 2 shows a more detailed block diagram of a receiver 27 of the crosspoint matrix switching system.

A set of encoded signals are propagated from crosspoint switching matrix 26 over a conduction medium, such as twisted-pair cable 37, to an interface circuit 38. Interface circuit 38 provides an output signal which is connected to an audio/video receiver and decoder 39. Interface circuit 38 further accepts an input signal from a data modem 41. Audio/video receiver and decoder 39 decodes the encoded signal and provides a set of audio/video outputs 40 in baseband format for the user. Data modem 41 accepts an input signal from a remote control input 42, applies a modulation or amplification to the signal to prepare it for transmission, and sends its output to interface circuit 38 for propagation back to crosspoint switching matrix 26.

FIG. 3 shows a block diagram of the control system for the crosspoint matrix switching system.

A set of encoded signals are propagated over a conduction medium, such as twisted-pair cable 37, from an interface circuit 43 on one end, to another interface circuit 38 on the other end as shown in FIG. 2. Interface circuit 43 accepts a set of encoded signals from an output node of crosspoint switching matrix 26 and provides a suitable electrical interface to drive said signals for propagation over twisted-pair cable 37. Interface circuit 43 further accepts a set of data signals from twisted-pair cable 37 and provides these data signals to data modem 44.

Data modem 44 demodulates the data signal from interface circuit 43, and provides the demodulated data signals to control circuitry 45.

Because crosspoint switching matrix 26 will accommodate a plurality of output nodes, each output node will have its own individual interface 43, and each interface circuit will have its own individual data modem 44. Thus an actual system will be comprised of a plurality of interface circuits 43, and a plurality of data modems 44, even though the example shown in FIG. 3 only shows one of each due to space constraints.

Control circuitry 45 accepts data inputs from a plurality of data modems 44, and additional data inputs such as a computer interface 46 and local control 35. Control circuitry 45 generates a set of control signals to cause crosspoint switching matrix 26 to select the desired configuration of the internal switching matrix, as commanded by any one of the plurality of data inputs.

It is important to understand how control circuitry 45 receives a command from a remote control unit which is located a significant distance from control circuitry 45 and crosspoint switching matrix 26. For the following descriptions, refer to both FIG. 2 and FIG. 3. When the user generates a command by way of an infrared remote control unit, or equivalent, the command is received by remote control input 42 of receiver 27, modulated by data modem 41, and sent by way of interface 38 for propagation by twisted-pair cable 37. After propagation by twisted-pair cable 37, the command is received by way of interface circuitry 43, and demodulated by data modem 44, until the command is presented to control circuitry 45 to cause crosspoint switching matrix 26 to change to the desired configuration. The result of this operation is that the user of receiver 27 is able to send commands to control circuitry 45, and thus control the selections of crosspoint switching matrix 26, so as to be able to access any of audio/video sources 10 to 17 from the remote location.

The combination of data modem 41, interface 38, twisted-pair cable 37, interface 43, and data modem 44 constitute a data communications system. This data communications system is able to convey the control signals from a remote location to the control system of crosspoint switching matrix 26.

It is evident from an examination of the descriptions for FIGS. 2 and 3 that the encoded audio/video signals travel across twisted-pair cable 37 from interface circuitry 43 to interface 38 on the other end. In contrast, the data signals which carry the commands for control circuitry 45 travel across twisted-pair cable 37 from interface 38 to interface circuitry 43, which is the opposite direction that the audio/video signals travel. In a preferred embodiment of this invention, these data signals which convey the commands for control circuitry 45 may use the same pair of wires as the audio/video signals sent along twisted-pair cable 37. In other embodiments of this invention, the data signals and audio/video signals may be sent over different pairs of wires of twisted-pair cable 37.

In the preceding paragraphs, it was mentioned that control circuitry 45 accepts data inputs from a plurality of data modems 44. This allows for control circuitry 45 to accept commands from each of a plurality of receivers 27 to 34. Because each receiver is able to separately and individually send commands to control circuitry 45, this allows for each receiver to be remotely located and provides an easy-to-use mechanism to select one of a large number of auxiliary audio/video sources, so that each remote television set or stereo system has full access to the same audio/video sources as the local television set and stereo system.

FIG. 4 shows the control system for the crosspoint matrix switching system 9, including an IR emitter 47 for the conveyance of control signals to audio/video source 10. Most audio/video sources in use are controlled by infrared remotes. This poses a problem when a user is in another room or some other location beyond the range of an infrared remote. There needs to be a mechanism for the user to control an audio/video source from the remote location where the audio/video listening and viewing area is. FIG. 4 shows how this is accomplished as part of the present invention. It was previously explained how control signals originating at a remote location are conveyed to control circuitry 45. Control circuitry 45 is able to decode the commands that are destined for it, for the selection of crosspoint switching matrix 26. All other commands are passed on by control circuitry 45 to the destination device, one of the audio/video sources 10 to 17, through an IR emitter 47. Control circuitry 45 contains either a suitable routing algorithm, or a suitable routing apparatus, which is able to convey the control signals to the particular audio/video source 10 to 17 which has been selected by control circuitry 45.

For example, suppose that audio/video source 10 is a digital video disk player, and a user in a remote viewing area desires to issue commands such as "Pause," "Play," and "Stop" to the digital video disk player. These commands are conveyed through data modem 44 to control circuitry 45. Control circuitry 45 passes on these commands to IR emitter 47, which then issues the commands to the digital video disk player to effect the desired operation. This results in an easy to use method for the user in a remote location to be able to control the audio/video source equipment, even though the source equipment is located beyond the range of an infrared remote control unit.

Because IR emitter 47 may be located a significant distance away from control circuitry 45, there needs to be a data communication system to convey the control signals from control circuitry 45 to IR emitter 47. This data communication system is comprised of a data modem 51, an interface 50, an interface 49, and a data modem 48. Interface 50 is connected to interface 49 by way of an interconnect cable, comprised of a twisted-pair cable or the equivalent thereof, so that interface 50 may be located a significant distance away from interface 49. In situations where IR emitter 47 is located in close proximity to control circuitry 45, then it is possible to directly connect IR emitter 47 to control circuitry 45, without the intervening data modems or data communication system.

Although the example shown in FIG. 4 only shows one IR emitter 47, an actual system will be comprised of a plurality of IR emitters 47, one for each of the plurality of audio/video sources 10 to 17.

Conclusion

In summary, an apparatus in accordance with the present invention for switching a plurality of audio, video, and data signals which could be carried over twisted-pair wires or other conductors. The electronic switching system in accordance with the present invention is comprised of a crosspoint matrix which allows any output node to be connected to any input node, regardless of how the other outputs are connected, which provides the advantage that any noise added by the switching matrix is prevented from degrading any of the audio, video, or data signals by the encoding and decoding mechanism, wherein the audio, video, and data signals have been encoded and combined into a single signal prior to the switching matrix.

Although the preferred embodiment of this invention may include the switching of signals which are intended for conduction over twisted-pair wires, other types of signals and other types of conduction methods may be utilized by the crosspoint switching system of this invention.

Although the preferred embodiment of this invention may include the switching of signals which have been encoded or modulated prior to the switching matrix, other embodiments of this invention may include the switching of baseband signals which have not been encoded or modulated prior to the switching matrix.

Although the preferred embodiment of this invention may include the switching of signals where the audio, video, and data signals have been combined so as to be carried by a single pair of wires, other embodiments of this invention may include the switching of signals where the audio, video, and data signals are carried over separate pairs of wires.

Portions of the description for this invention have included examples describing how this invention could be used as part of a home entertainment system. However, the application of this invention is much broader, and includes many other applications needing the electronic switching of audio, video, and data signals besides home entertainment systems. Examples of some of these other applications may include video distribution for security systems, audio/video distribution for schools or conference rooms, video monitors for airports, or other audio/video distribution applications.

Thus the scope of the invention should be determined by the appended claims and their legal equivalents, rather than by the examples given.

Advantages of this Product

A system and method in accordance with the present invention provides the following advantages:

(a) to provide an electronic switching system which allows for a plurality of external devices, such as television sets and/or stereo systems, to be located remotely from the audio/video sources, and have access to a large number of auxiliary audio/video sources, and provide an easy-to-use mechanism to select one of these sources, so that each remote television set or stereo system has full access to the same audio/video sources as the local television set and stereo system;

(b) to provide a means whereby the audio/video signals are carried over an inexpensive medium, such as twisted-pair wires, which has the advantage of being easier to install than a large bundle of coaxial cables;

(c) to provide an electronic switching system comprised of a crosspoint matrix switching system and a suitable control system which includes a method to route, either via a routing algorithm or a suitable routing apparatus, the control signals emanating from a particular remote control input to a selected audio/video source, said control signals being routed in a reverse direction that the audio/video signals are; and (d) to provide an encoding and decoding mechanism which allows for the audio/video signals to be transmitted over a substantial distance without any appreciable degradation in the signal quality, so as to allow each of a plurality of receiver units to be located remotely from the electronic switching system.

(e) to provide a means whereby a user may add additional source equipment to an existing audio/video entertainment system, and the additional audio/video signals are made available to a remote location without adding any additional cables, since the switching and distribution systems allows for each of a plurality of audio/video signals to be selected and routed to the remote location using a twisted-pair cable.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system adapted for switching over conductors capable of including an unshielded cable including a twisted pair cable, signals received by the system from a plurality of audio/video sources, the system comprising:

a plurality of encoders each of which is adapted for concurrently receiving a plurality of baseband signals from specific sources included among the plurality of sources and for producing from the received signals a single encoded signal; and a crosspoint switching matrix means adapted for concurrently receiving encoded signals from each of the plurality of encoders and for concurrently providing signals received from the encoders to a plurality of receivers;

wherein the plurality of encoders are directly coupled to the crosspoint switching matrix; and wherein the crosspoint switching matrix is coupled directly to the conductors, and the conductors are external to the system.

2. The system of claim 1 wherein the crosspoint matrix means comprises:

a crosspoint switching matrix;

a local control coupled to the crosspoint switching matrix; and a display coupled to the crosspoint switching matrix.

3. The system of claim 1 which includes a control system coupled to the crosspoint switching matrix.

4. The system of claim 3 wherein the control system comprises:

control circuitry coupled to the crosspoint switching matrix;

interface circuitry coupled between the crosspoint switching matrix and the conductors; and a modem coupled between the control circuitry and a corresponding modem of at least one of the plurality of receivers.

5. The system of claim 4 wherein the control system includes a computer interface coupled to the control circuitry.

6. The system of claim 1 wherein encoders produce a single modulated carrier signal from the received signals.

7. An electronic switching system adapted for switching over conductors capable of including an unshielded cable including a twisted pair cable, signals received by the electronic switching system from a plurality of audio/video sources, the electronic switching system comprising:

a plurality of encoders each of which is adapted for concurrently receiving a plurality of baseband signals from specific sources included among the plurality of sources and for producing from the received signals a single encoded signal;

a crosspoint switching matrix adapted for concurrently receiving encoded signals from each of the plurality of encoders and for concurrently providing signals received from the encoders to a plurality of receivers; and a control system coupled to the crosspoint switching matrix, the control system routing control signals from a remote control input to a source, wherein the control signals travel from the remote control input in a direction opposite to a direction in which encoded signals travel from the crosspoint switching matrix to receivers;

wherein the conductors are external to the electronic switching system; and wherein the plurality of encoders are directly coupled to the crosspoint switching matrix and the crosspoint switching matrix is coupled directly to the conductors.

8. The system of claim 5 wherein the control system includes a routing algorithm.

9. The system of claim 5 wherein the control system includes a routing apparatus.

10. The system of claim 7 wherein encoders produce a single modulated carrier signal from the received signals.

11. The system of claim 7 wherein the control signals select the source to which the control system routes control signals.

* * * * *